United States Patent
Crabbé et al.

[15] 3,682,984
[45] Aug. 8, 1972

[54] 17α-(2,3-METHYLENE-PROP-1-EN-1 YL)-STEROIDS AND 17α-(2,3-MONOHALOMETHYLENE AND 2,3-DIHALOMETHYLENE) DERIVATIVES THEREOF

[72] Inventors: Pierre Crabbé, Mexico; Ulrich Werner Graf, Cuernavaca, both of Mexico

[73] Assignee: Syntex Corporation, Panama, Panama

[22] Filed: Jan. 19, 1970

[21] Appl. No.: 4,116

[52] U.S. Cl.....260/397.4, 260/239.55 R, 260/397.5, 260/999
[51] Int. Cl......................C07c 169/08, C07c 169/22
[58] Field of Search ......./Machine Searched Steroids

[56] References Cited

UNITED STATES PATENTS

| 3,392,165 | 7/1968 | Edwards et al. | 260/239.55 |
| 3,392,166 | 7/1968 | Edwards et al. | 260/239.55 |
| 3,385,871 | 5/1968 | Edwards et al. | 260/397.4 |
| 3,478,019 | 11/1969 | Edwards | 260/239.55 |

*Primary Examiner*—Henry A. French
*Attorney*—Evelyn K. Merker and Gerard A. Blaufarb

[57] ABSTRACT

A physiologically active steroidal compound of the partial formula

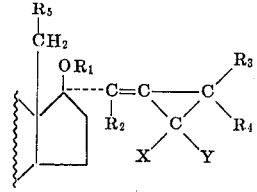

wherein $R_1$ is H, carboxylic acyl groups of less than 12 carbon atoms, tetrahydropyran-2-yl, tetrahydrofuran-2-yl, or 4-methoxy tetrahydropyran-4-yl, $R_2$, $R_3$, and $R_4$ are H, or a lower alkyl, preferably methyl, $R_5$ is H, a lower alkyl such as methyl, ethyl or propyl, and X and Y are independently H, F, Br or Cl.

11 Claims, No Drawings

17α-(2,3-METHYLENE-PROP-1-EN-1 YL)-STEROIDS AND 17α-(2,3-MONOHALOMETHYLENE AND 2,3-DIHALOMETHYLENE) DERIVATIVES THEREOF

The present invention relates to steroidal compounds. These compounds have the partial formula

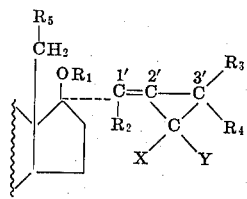

(I)

wherein $R_1$ is H, carboxylic acyl groups of less than 12 carbon atoms, tetrahydrofuran-2-yl, tetrahydropyran-2-yl, and 4-methoxy tetrahydropyran-4-yl. Each of $R_2$, $R_3$, and $R_4$ is independently H, or a lower alkyl, preferably methyl, $R_5$ is H or a lower alkyl such as methyl, ethyl or propyl and X and Y are independently H, F, Br, or Cl.

In a further aspect, the invention relates to steroids of the following formulas:

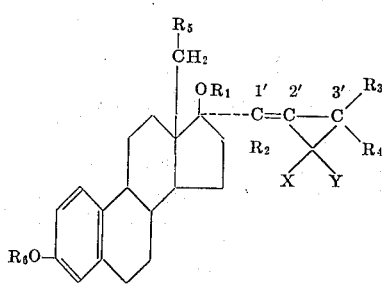

(II)

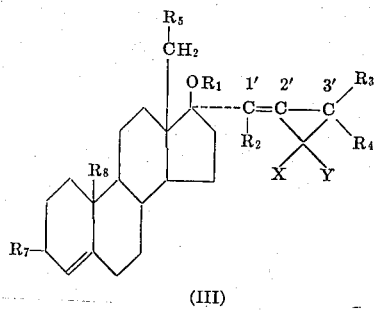

(III)

wherein $R_1$, $R_2$, $R_3$, $R_4$, $R_5$, X and Y are as defined above; $R_6$ is H, a lower alkyl, a carboxylic acyl group of less than 12 carbon atoms, cyclopentyl, tetrahydropyran-2-yl and tetrahydrofuran-2-yl, $R_7$ is oxo, or the group

wherein $R_9$ is hydrogen, hydroxy, tetrahydropyran-2-yloxy, tetrahydrofuran-2-yloxy or carboxylic acyloxy groups containing less than 12 carbon atoms, and $R_8$ is H, or methyl.

The carboxylic acyl and acyloxy groups of the compound of the present invention contain less than 12 carbon atoms and can be of a straight, branched, cyclic, or cyclic-aliphatic chain structure. This structure can be saturated, unsaturated or aromatic and can be substituted with functional groups such as hydroxy, alkoxy containing up to five carbon atoms, acyloxy containing up to 12 carbon atoms, nitroamino, halogeno, and the like. Typical esters include, for example, acetate, propionate, enanthate, benzoate, trimethylacetate, t-butylacetate, phenoxyacetate, cyclopentylpropionate, aminoacetate, β-chloropropionate, adamantoate, dichloroacetate, and the like. The term lower alkyls refers to alkyls having from one through six carbon atoms. As used herein, the term 17α-methylene propenyl includes both the dihydro, monohalo and dihalomethylene propenyl derivatives.

Typical compounds represented by Formula (II) include 17α-(2′, 3′-methylene-prop-1′-en-1′-yl)-estra-1,3,5(10)-triene-3,17β-diol; 17α-(2′,3′-monofluoromethylene-prop-1′-en-1′-yl)-estra-1,3,5(10)-triene-3,17β-diol; 3-methoxy-17α-(2′,3′-methylene-prop-1′-en-1′-yl)-estra-1,3,5(10)-triene-17β-ol; 3-methoxy-17α-(2′,3′-monofluoromethylene-prop-1′-en-1′-yl)-estra-1,3,5(10)-triene-17β-ol; 17α-(2′,3′-methylene-prop-1′-en-1′-yl)-17β-(tetrahydropyran-2′-yloxy)-estra-1,3,5(10)-triene-3-ol; 17α-(2′,3′-monobromomethylene-prop-1′-en-1′-yl)-17β-(tetrahydropyran-2′-yloxy)-estra-1,3,5(10)-triene-3-ol; 3,17β-(ditetrahydrofuran-2′-yloxy)-17α-(2′,3′1′-en-1′-yl)-estra-1,3,5(10)-triene; 3,17β-(ditetrahydrofuran-2′-yloxy)-17α-(2′,3′-monobromomethylene-prop-1′-en-1′-yl)-estra-1,3,5(10)-triene; 3-acetoxy-17α-(2′,3′-methylene-prop-1′-en-1′-yl)-estra-1,3,5(10)-triene-17β-ol; 3-acetoxy-17α-(2′,3′-monochloromethylene-prop-1′-en-1′-yl)-estra-1,3,5(10)-trien-17β-ol; 17α-(2′,3′-methylene-prop-1′-en-1′-yl)18-methylestra-1,3,5(10)-triene-3,17β-diol; 17α-(2′,3′-monochloromethylene-prop-1′-en-1′-yl)-18-methylestra-1,3,5(10)-triene-3,17β-diol; 17α-(2′,3′-methylene-prop-1′-en-1′-yl)-18-ethylestra-1,3,5(10)-trien-3,17β-ol; 17α-(2′,3′-monochloromethylene-prop-1′-en-1′-yl)-18-ethylestra-1,3,5(10)-trien-3,17α-ol; 3-methoxy-17α-(2′,3′-methylene-prop-1′-en-1′-yl)-17β-acetoxy-18-ethylestra-1,3,5(10)-triene; 3-methoxy-17α-(2′,3′-monobromomethylene-prop-1′-en-1′-yl)-17β-acetoxy-18-ethylestra-1,3,5(10)-triene; 3-acetoxy-17α -(2′,3′-methylene-prop-1′-en-1′-yl)-17β-(4′-methoxy tetrahydropyran-4′-yloxy)-estra-1,3,5(10)-triene; 3-acetoxy-17α-(2′,3′-monofluoromethylene-prop-1′-en-1′-yl)-17β-(4′-methoxy tetrahydropyran-4′-yloxy)-estra-1,3,5(10)-triene; 3-acetoxy-17α-(1′-methyl-2′,3′-methylene-prop-1′-en-1′-yl)-estra-1,3,5(10)-trien-17β-ol; 3-acetoxy-17α-(1′-methyl-2′,3′-monochloromethyl-prop- 1′-en-1′-yl)-estra-1,3,5(10)-trien-17β-ol; 3-acetoxy-17α-(3′-methyl-2′,3′-methylene-prop-1′-en-1′-yl)-estra-1,3,5(10)-trien-17β-ol; 3-acetoxy-17α-(3′-methyl-2′,3′-monochloromethylene-prop-1′-en-1′-yl)-estra-1,3,5(10)-trien-17β-ol; 3-acetoxy-17α-(3′,3′-dimethyl-2′,3′1′-en-1′-yl)-estra-1,3,5(10)-trien-17β-ol; 3-acetoxy-17α-(3′,3′-dimethyl-2′,3′-monochloromethylene-prop-1′-en-1′-yl)-estra-1,3,5(10)-trien-17β-ol; and the like. The preferred compounds of Formula II are those wherein $R_6O$ is hydroxy or methoxy, $R_5$ is H, $OR_1$ is hydroxy, and X and Y are independently H or F.

Typical compounds represented by Formula (III) include 17α-(2',3'-methylene-prop-1'-en-1'-yl)-17β-hydroxy-estr-4-en-3-one; 17α-(2',3'-monofluoromethylene-prop-1'-en-1'-yl)-17β-hydroxy-estr-4-en-3-one; 3-desoxy-17α-(2',3'-methylene-prop-1'-en-1'-yl)-estr-4-en-3β,17β-diol; 3-desoxy-17α-(2',3'1'-en-1'-yl)-estr-4-en-3β,17β-diol; 17α-(1'-methyl-2',3'-methylene-prop-1'-en-1'-yl)-androst-4-en-3β,17β-diol; 17α-(1'-methyl-2',3'-monobromomethylene-prop-1'-en-1'-yl)-androst-4-en-3β,17β-diol; 17α-(2',3'-methylene-prop-1'-en-1'-yl)-17β-acetoxy-androst-4-en-3β-ol; 17α-(2',3'-monochloromethylene-prop-1'-en-1'-yl)-17β-acetoxy-androst-4-en-3β-ol; 3β,17β-diacetoxy-17α-(2',3'-methylene-prop-1'-en-1'-yl)-androst-4-ene; 3β,17β-diacetoxy-17α-(2',3'-chloromethylene-prop-1'-en-1'-yl)-androst-4-ene; 17β-acetoxy-17α-(2',3'-methylene-prop-1'-en-1'-en-1'-yl)-androst-4-en-3-one; 17β-acetoxy-17α-(2',3'-monochloromethylene-prop-1'-en-1'-yl)-androst-4-en-3-one; 17α-(2',3'-methylene-prop-1'-en-1'-yl)-17β-hydroxy-androst-4-en-3-one; 17α-(2',3'-monofluoromethylene-prop-1'-en-1'-yl)-17β-hydroxy-androst-4-en-3-one; 3-desoxy-17α-(2',-3'-methylene-prop-1'-en-1'-yl)-17β-acetoxy-androst-4-ene; 3- -desoxy-17α-(2',3'-monofluoromethylene-prop-1'-en-1'-yl)-17β-acetoxy-androst-4-ene; 17α-(1'-methyl-2', 3'-methylene-prop-1'-en-1'-yl)-17β-(tetrahydrofuran-2'-yloxy)-androst-4-en-3-one; 17α-(1'-methyl-2',3'-monobromoethylene-prop-1'-en-1'-yl)-17β-(tetrahydrofuran-2'-yloxy)-androst-4-en-3-one; 3β-acetoxy-17α-(3',3'-dimethyl-2',3'-methylene-prop-1'-en-1'-yl)-androst-4-en-17β-ol; 3β-acetoxy-17α-(3',3'-dimethyl-2',3'-monochloromethylene-prop-1'-en-1'-yl)-androst-4-en-17β-ol, and the like. The preferred compounds of Formula III are those wherein R₅ is H or methyl, R₇ is oxo or the group

wherein R9 is H or hydroxy, OR₁ is hydroxy or acetate, and X and Y are independently H or F.

The novel 17α-methylene propenyl steroid of Formula (II) of this invention possess estrogenic activity and are useful in the treatment of various conditions in which such agents are indicated, such as estrogen deficiencies, memopause, and the like. These compounds can also be used in veterinary medicine in the same manner as known estrogens and in the control and regulation of fertility. In addition, these agents demonstrate anti-androgenic activity. They can be administered in the usual pharmaceutical compositions at dosages appropriate for the condition being treated.

The 17α-methylene propenyl steroids of Formula (III) demonstrate progestational, anti-estrogen and pituitary inhibition activity and are useful in the treatment of various menstrual disorders and in the control and regulation of fertility. They can be administered in the usual pharmaceutical compositions at dosages appropriate for the condition being treated.

The 17α-dihalomethylene propenyl steroidal compounds of this invention are prepared by a one-step dihalocarbene insertion reaction wherein a 17α-propadiene or a 17α-alkyl substituted propadienyl steroid is reacted with a dihalocarbene precursor as follows:

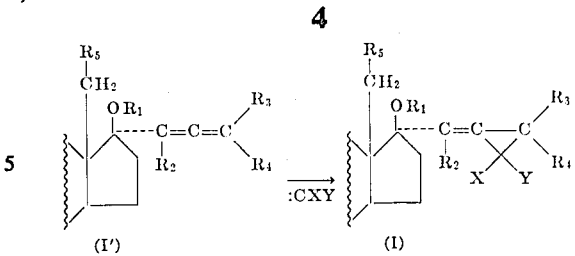

wherein R₁, R₂, R₃, R₄, R₅, X and Y are as defined above.

The 17α-dihydromethylene propenyl derivatives can be prepared by reaction of the 17α-propadiene steroid in the above illustrated manner, with bis (bromomethyl) mercury in boiling benzene. The HF, HBr and HCl derivatives can, for example, be prepared by reduction of the appropriate 17α-dihalomethylene steroid with tri-n-butyltin hydride in the presence of di-t-butyl peroxide in mixture with an inert organic solvent such as, for example, ether, benzene, or toluene, at temperatures in the range of about from 30°–120° C.

The 17α-alkyl substituted alkadiene-estra-1,3,5(10)-triene starting materials in the above described reactions are disclosed in U.S. Pat. No. 3,392,165, incorporated herein by reference. Accordingly, these starting materials are themselves prepared from 17α-dihalocyclopropyl estratrienes. By one disclosed procedure, a 17α-dihalocyclopropyl estratriene is reacted with an alkyl lithium reagent such as butyl lithium in an inert solvent medium such as a hydrocarbon, ether, chlorinated hydrocarbon, and mixtures thereof. The alkyl lithium reagent is present in a molar excess and the reaction is conducted at room temperature or above for about 3 to 24 hours or more.

The 17α-alkadiene androst-4-ene and the 17α-alkadiene estr-4-ene starting materials in the above described reactions are disclosed in U.S. Pat. No. 3,392,166, incorporated herein by reference. Accordingly, these starting materials are themselves prepared from 17α-dihalocyclopropyl compounds. By one such procedure, a 17α-dihalocyclopropyl estr-4-ene is reacted with a molar excess, preferably about 2 to 10 molar equivalents of an alkyl lithium such as butyl lithium. The reaction is carried out in an inert reaction medium such as dioxane, tetrahydrofuran, hexane, and the like, at a temperature of from −40° to 0° C., for about 1 to 24 hours or more, preferably at −30° C. for about 1 hour.

The dihalo carbenes can be generated in any suitable manner, such as for example, from alkali metal salts of trihaloacetic acid, such as sodium trichloroacetate, sodium chlorodifluoro acetate, sodium fluorodichloro acetate, and the like, dissolved in a suitable solvent. Other suitable dihalo carbene precursors include, for example, phenyl (tribromomethyl) mercury, phenyl (trichloromethyl) mercury, phenyl (fluorodichloromethyl) mercury-sodium iodide, phenyl (chlorodibromomethyl) mercury, phenyl (fluorodibromomethyl) mercury, trimethyl (trifluoromethyl) mercury-sodium iodide, bromoform-potassium t-butoxide and the like.

The carbene insertion reaction is conducted under anhydrous conditions in an inert solvent. The precursor is added to the steroid admixed with a suitable solvent heated to the described reaction temperature. The steroid can alternatively be added to a solution of precursor and solvent and the mixture subsequently heated. The particular solvent, as well as the temperature of reaction, will depend upon particular carbene precursor selected. Different precursors liberate carbene under different conditions.

The alkaline metal salts of trihaloacetic acid liberate the carbene by way of a thermal decarboxylation. The metal salt is dissolved in a suitable solvent such as diethylene glycol dimethyl ether, diglyme, triethylene glycol dimethyl ether, and the like, the steroid added, and the mixture heated to the appropriate temperature. In the case of diglyme, the salt solution is heated to between 120° to 165° C., in the presence of the steroid. The temperatures to which the other aforementioned solvents are desirably heated are available from the literature or can easily be determined by routine experimentation. The bromoform-potassium t-butoxide precursor, contains bromoform in an excess of 20–50 equivalents. Said precursor is dissolved in a suitable solvent such as tetrahydrofuran cyclohexane, t-butanol, and the like, and reacted at temperatures in the range of about from −10° to 20° C., and for best results about from −10° to 0° C. The phenyl (trihalomethyl) mercury precursors liberate carbene upon thermal treatment in a suitable solvent, such as boiling benzene. The carbene can be generated from phenyl (trihalomethyl) mercury at lower temperatures, e.g., 30° C. when heated in benzene in the presence of sodium iodide. The trimethyl (trifluoromethyl) tin precursor forms the carbene under similar thermal conditions. The trihalomethyl tin generates carbene when dissolved in a suitable solvent such as benzene, toluene or the like, and heated at reflux in the presence of sodium iodide. Other suitable procedures for generating carbenes are described in the *J. of Am. Chem. Soc.*, Vol. 82, page 1188 (1960) and Kirmse, *Carbene Chemistry*, Vol 1, Academic Press, pages 145–169 (1964). Still other precursors will be readily apparent to those of ordinary skill in the art.

Generally, one to 10 molar equivalents of the carbene precursor in a suitable solvent is reacted with the 17α-propadienyl steroid. However, as much as 20 and even 50 molar equivalents of the carbene precursor can be reacted with the steroid.

The 17α-methylene propenyl-17β-hydroxy compound of this invention may be converted to the corresponding 17β-acyloxy-17β-(tetrahydropyran-2'-yloxy) or 17β-(tetraydrofuran-2'-yloxy) derivative by conventional methods prior to preparing the 17α-methylene propenyl steroids or can be esterified or etherified thereafter. It is preferred, however, to carry out the carbene insertion reaction with the 17β-acyloxy steroid, and then convert the thus obtained steroid to the 17β-hydroxy, or other derivatives.

The substituent at the 3-position of the estratriene nucleus can be a hydroxy group or an etherified group, e.g., methoxy, tetrahydropyran-2-yloxy, tetrahydrofuran-2-yloxy, cyclopentyloxy, and the like. These derivatives can be prepared prior to the preparation of the novel 17α-methylene propenyl derivatives or can be formed thereafter by conventional methods. Thus, treatment with an appropriate carboxylic acid anhydride such as acetic anhydride in pyridine with a 3,17β-dihydroxy estratriene yields the 3-acyloxy-17β-hydroxy derivative selectively. Use of an acid anhydride in the presence of the corresponding acid and an acid catalyst such as p-toluenesulfonic acid yields the 3,17β-diacyloxy derivatives. This diester can then be selectively saponified, after the carbene reaction, through the use of methanolic potassium bicarbonate, to yield the corresponding 3-hydroxy-17β-acyloxy derivative. Similarly, etherification can be performed via conventional procedures. Thus, treatment of the hydroxy derivative with dihydropyran in the presence of an acid catalyst such as p-toluenesulfonic acid, p-toluenesulfonyl chloride, dinitrobezene sulfonic acid or the like, yields the corresponding tetrahydropyran-2-yloxy derivative. Formation of the mono-tetrahydropyranyl ether can be accomplished by selective protection of other hydroxy groups as through ester formation, in the manner described above, with alkaline hydrolysis of such ester groups after formation of the ether, if desired. Formation of 3-methoxy derivatives will be realized through the use of dimethylsulfate and potassium hydroxide in the conventional manner.

The 3-keto group of the 17β-methylene propenyl estrene or androstene may be reduced with sodium borohydride, lithium aluminum tri(t-butoxy) hydride, or the like to obtain the 3β-hydroxy steroid. The resulting 3β-hydroxy group may then be etherified by treatment with dihydropyran or dihydrofuran and an acid catalyst or esterified by treatment with an appropriate carboxylic acid anhydride such as acetic acid anhydride, in pyridine and the like. Other techniques will be readily apparent to those skilled in the art.

The 17β-hydroxy estrene or androstene can be converted to the corresponding 17β-acyloxy, 17β-tetrahydropyran-2-yloxy, or 17β-tetrahydrofuran-2-yloxy derivatives by conventional methods, such as those already set forth. The 3-desoxy derivatives of Formula (III) can be prepared from the corresponding 3-keto derivatives by thioketalization followed by desulfurization with Raney nickel.

A further understanding of the invention can be had from the following examples.

EXAMPLE 1

From a solution of 3.4 g. (20 mm.) of sodium difluorochloroacetate in 30 ml. of diglyme (distilled over potassium hydroxide pellets), about 10 ml. of the diglyme is distilled off at 30° to 40° C. in vacuum. The remaining solution is transferred to a dropping funnel which is placed onto a 3-neck flask. In the flask, 700 mg. (2 mm.) of 17β-acetoxy-17α-(propadien-1'-yl)-estr-4-en-3-one is dissolved in 17 ml. of diglyme and heated to the boiling point. The sodium salt solution is added dropwise within 1 hour while a total of 40 ml. of diglyme is distilled from the reaction mixture at normal pressure. The reaction mixture if refluxed for 10 minutes, cooled, filtered and evaporated. The crude product is separated by preparative thick-layer chromatography in hexane-ethyl acetate. About 300 mg. of 17β-acetoxy-17α-(2',3'-difluoromethylene-prop-1'-en-1'-yl)-estr-4-en- 3-one and 110 mg. of crude unreacted 17α-propadiene is obtained. The difluoromethylene propenyl estrenone was recrystallized from acetone-water.

In a like manner, 17β-hydroxy-17α-(propadien-1'-yl)-estr-4-en-3-one, 17β-(tetrahydropyran-2'-yloxy)-

17α-(propadien-1'-yl)-estr-4-en-3-one, 17β-acetoxy-17α-(propadien-1'-yl)-androst-4-en-3-one are reacted with sodium difluorochloroacetate to yield the corresponding difluoromethylene derivatives.

EXAMPLE 2

To a stirred solution of 10 g. of sodium trichloroacetate in 100 ml. of diethylene glycol dimethyl ether, is added 0.8 grams of 17α-(propadien-1'-yl)-17β-acetoxy-androst-4-en-3-one and the mixture heated to 130° C. and reacted for approximately 2 hours. The mixture is subsequently cooled, and poured into cold water. The solid which forms is collected, washed with water and dried to yield 17α-[2',3'-dichloromethylene-prop-1'-en-1'-yl]-androst-4-en-3-one.

In a like manner 17α-(propadien-1'-yl)-17β-(tetrahydropyran-2'-yloxy)-androst-4-en-3-one, 17α-(propadien-1'-yl)-17β-(tetrahydrofuran-2'-yloxy)-androst-4-en-3-one and 17α-(propadien-1'-yl)-17β-4'-methoxy tetrahydropyran-4'-yloxy)-androst-4-en-3-one are reacted with sodium trichloroacetate, yielding 17α-(2',3'-dichloromethylene-prop-1'-en-1'-yl)-17β-(tetrahydropyranyl-2'-yloxy)-androst-4-en-3-one, 17α-(2',3'-dichloromethylene-prop-1'-en-1'-yl)-17β-(tetrahydrofuran-2'-yloxy)-androst-4-en-3-one and 17α-(2',3'-dichloromethylene-prop-1'-en-1'-yl)-17β-(4'-methoxy tetrahydropyran-4'-yloxy)-androst-4-en-3-one.

Repeating the above procedure substituting sodium tribromoacetate for sodium trichloroacetate, the corresponding dibromomethylene-propenyl derivatives are obtained.

EXAMPLE 3

To a refluxing solution of 1 g. of 17α-(propadien-1'-yl)-17β-hydroxy-estr-4-en-3-one in 10 ml. of diethylene glycol dimethyl ether is added over a 2 hour period in dropwise fashion with stirring, a solution of 35 equivalents of sodium fluorodichloroacetate in 40 ml. of diethylene glycol dimethyl ether. After refluxing for an additional hour, the mixture is filtered. The filtrate is evaporated to dryness and the residue is chromatographed on alumina eluting with methylene chloride to yield 17α-(2',3'-fluorochloromethylene-prop-1'-en-1'-yl)-17β-hydroxyestr-4-en-3-one.

EXAMPLE 4

To a solution of 1.4 equivalents of phenyl (fluorodichloromethyl) mercury and 1.4 equivalent NaI in 20 ml. of benzene is added about 0.3 g. of 17β-acetoxy-17α-(propadien-1'-yl)-estr-4-en-3-one. The mixture is heated to reflux and allowed to react under reflux for 18 hours. Thereafter, the mixture is cooled to room temperature and filtered. The filtrate is evaporated to dryness and the residue chromatographed on alumina eluting with benzene to yield 17β-acetoxy-17α-(2',3'-fluorochloromethylene-prop-1'-en-1'-yl)-estr-4-en-3-one.

The above procedure is repeated using phenyl (chlorodibromomethyl) mercury, phenyl (trichloromethyl) mercury and phenyl (tribromomethyl) mercury to yield the fluorobromo, bromochloro, dibromo and dichloro methylene propenyl derivatives respectively.

EXAMPLE 5

To a stirred solution of 2 grams of 17β-acetoxy-17α-(propadien-1'-yl)-estr-4-en-3-one in 100 ml. of cyclohexane, cooled to 0° C. is added 20 equivalents CH Br₃ and 20 equivalents of solid t-butoxide. The mixture is allowed to react for 6 hours at 0°, poured into water and crude product, isolated by extraction with ethyl acetate. The resulting product, 17β-acetoxy-17α-(2',3'-dibromomethylene-prop-1'-en-1'-yl)-estr-4-en-3-one is purified by chromatography on alumina and recrystallized from pentane.

EXAMPLE 6

To a refluxing solution of 2 grams of 17β-acetoxy-17α-(propadien-1'-yl)-androst-4-en-3-one in 50 ml. of benzene is added in dropise fashion 15 molar equivalents of bis(bromomethyl) mercury in 20 ml. of benzene. The mixture is allowed to boil for 18 hours, cooled to room temperature and filtered. The filtrate is washed with water and evaporated to dryness and the residue chromatographed on alumina eluting with benzene and benzene-ether mixtures to yield 17β-acetoxy-17α-(2',3'-dihydromethylene-prop-1'-en-1'-yl)-androst-4-en-3-one.

EXAMPLE 7

One gram of 17β-acetoxy-17α-(2',3'-fluorochloromethylene-prop-1'-en-1'-yl)-estr-4-en-3-one produced by the method of Example 4 is dissolved in 25 ml. of benzene containing 0.2 g. of di-t-butylperoxide to which 14 molar equivalents of trin-butyltin hydride is added and the mixture heated to 80° C. The mixture is allowed to react at this temperature for 18 hours, cooled, filtered, washed with water, dried and evaporated under vacuum. The residue is chromatographed on neutral alumina, eluting with hexane and hexane-benzene mixtures to yield 17β-acetoxy-17α-(2',3'-monofluoromethylene-prop-1'-en-1'-yl)-androst-4-en-3-ol.

In a similar manner 17β-acetoxy-17α-(2',3'dichloromethylene-prop-1'-en-1'-yl)-estr-4-en-3-one and 17β-acetoxy-17α-(2',3'-dibromomethylene-prop-1'-en-1'-yl)-estr-4-en-3-one are reacted to yield 17β-acetoxy-17α-(2',3'-hydrochloro-methylene-prop-1'-en-1'-yl)-estr-4-en-3-one and 17β-acetoxy17α-(2',3'-hydrobromomethylene-prop-1'-en-1'-yl)-estr-4-en-3-one.

EXAMPLE 8

One gram of 17β-acetoxy-17α-(2',3'-difluoromethylene-prop-1'-en-1'-yl)-estr-4-en-3-one produced following the procedure of Example 1 is allowed to stand at room temperature for 15 hours with 1 g. of potassium bicarbonate in 10 ml. of water and 90 ml. of methanol. At the end of this time, the methanol is evaporated under reduced pressure and the residue extracted with ethyl acetate and water. Evaporation of the ethyl acetate from these extracts yields 17β-hydroxy-17α-(2',3'-difluoromethylene-prop-1'-en-1'-yl)-estr-4-en-3-one which is collected by filtration and recrystallized from acetone:hexane.

EXAMPLE 9

The 17β-hydroxy estrenone obtained in Example 8 is dissolved in 60 ml. of anhydrous tetrahydrofuran and 1.2 molar equivalents of ethylmagnesium bromide in ether is added. After a few minutes, 1.2 molar equivalents of propionyl chloride is added. The mixture is allowed to stand at room temperature for 15 hours, then diluted with water, and extracted with methylene chloride. The extracts are washed with water to neutrality, dried and evaporated. The residue is chromatographed on neutral alumina, eluting with ether:hexane to yield 17β-propionoxy-17α-(2',3'-difluoromethylene-prope1'-en-1'-yl)-estr-4-en-3-one.

EXAMPLE 10

Two milliliters of dihydropyran are added to a solution of 1 g. of 17β-hydroxy-17α-(2',3'-difluoromethylene-prop-1'-en-1'-yl)-estr-4-en-3-one (prepared by the procedure of Example 8) in 15 ml. of benzene. About 1 ml. is removed by distillation to remove moisture and 0.4 g. of p-toluene sulfonic acid is added to the cooled solution. This mixture is allowed to stand at room temperature for 4 days, and is then washed with aqueous sodium carbonate solution and water, dried and evaporated. The residue is chromatographed on neutral alumina, eluting with hexane to yield 17β-(tetrahydropyran-2'-yloxy)-17α-(2',3'-difluoromethylene-prop-1'-en-1'-yl)-estr-4-en-3-one which is recrystallized from pentane.

Similarly, following the above procedure, other 17β-hydroxy-17α-(dihalomethylene-prop-1'-en-1'-yl) compounds are converted to the corresponding 17β-(tetrahydropyran-2'-yloxy) derivatives, e.g. 17β-(tetrahydropyran-2'-yloxy)-17α-(2',3'-dichloromethylene-prop-1'-en-1'-yl)-18-methylestr-4-en-3-one, 3β-acetoxy-17β-(tetrahydropyran-2'-yloxy)-17α-(2',3'-dibromomethylene-prop-1'-en-1'-yl)-androst-4-ene, and the like.

EXAMPLE 11

A solution of 1 g. of 17β-hydroxy-17α-(2',3'-difluoromethylene-prop-1'-en-1'-yl)-estr-4-en-3-one (prepared by the procedure of Example 8) in 50 ml. of tetrahydrofuran is added over a 30 minute period to a stirred suspension of 1 g. of lithium aluminum hydride in 50 ml. of anhydrous tetrahydrofuran and this mixture is heated at reflux for 2 hours. To the mixture is added 5 ml. of ethyl acetate and 2 ml. of water. Sodium sulfate is next added, the mixture filtered and the solid thus collected is washed with hot ethyl acetate. The combined organic solutions are then evaporated to yield 17α-(2',3'-difluoromethylene-prop-1'-en-1'-yl)-estr-4-en-3β,17β-diol, which is further purified through recrystallization from acetone:hexane.

Use of this procedure with the other 3-keto-17β-hydroxy compounds described above will similarly yield the 3β,17β-diol derivatives, e.g. 17α-(3'-methyl-2',3'-dichloromethylene-prop-1'-en-1'-yl)-estr-4-en-3β,17β-diol, 17α-(2',3'-bromochloromethylene-prop-1'-en-1'-yl)-androst-4-en-3β,17β-diol, and the like.

EXAMPLE 12

To a solution of 1 g. of 17α-(2',3'-difluoromethylene-prop-1'-en-1'-yl)-estr-4-en-3β,17β-diol (prepared according to the method of Example 11) is added 1 g. of acetic anhydride in 50 ml. of pyridine and the mixture allowed to stand for 5 hours. At the end of this time, the reaction mixture is precipitated with water and the precipitate filtered off and dried. The solid product 3β-acetoxy-17α-(2',3'-difluoromethylene-prop-1'-en-1'-yl)-estr-4-en-17β-ol, is then recrystallized from acetone-hexane.

EXAMPLE 13

To a solution of 0.5 g. of 17β-acetoxy-17α-(2',3'-difluoromethylene-prop-1'-en-1'-yl)-estr-4-en-3-one in 50 ml. of tetrahydrofuran is added over a 30 minute period, 2 grams of lithium tri-t-butoxy aluminum hydride in 50 ml. of anhydrous tetrahydrofuran, and the mixture heated at reflux for 2 hours. To this mixture 5 ml. of ethyl acetate and 2 ml. of water are then added to the mixture. Sodium sulfate is next added, the mixture filtered and the solid thus collected washed with hot ethyl acetate. The combined organic solutions are evaporated to yield 17β-acetoxy-17α-(2',3'-difluoromethylene-prop-1'-en-1'-yl)-estr-4-en-3β-ol, which is further purified through recrystallization from acetone:hexane.

The thus obtained 17β-acetoxy-estr-4-en-3-ol is reacted with 10 ml. of dihydropyran in the presence of 0.1 g. of p-toluenesulfonyl chloride and 25 ml. of ether, to yield the corresponding 3β-(tetrahydropyran-2'-yloxy)-17α-(2',3'-difluoromethylene-prop-1'-en-1'-yl)-17β-acetoxy-estr-4-one. Substituting dihydrofuran in the above reaction the corresponding 3β-(tetrahydrofuran-2'-yloxy) derivative is obtained. The 3β-tetrahydropyran-17β-acetoxy derivative is hydrolyzed to the 17β-hydroxy form by reaction with potassium hydroxide and methanol under reflux.

Similarly, following the procedures outlined above, other 17α-(2',3'-difluoromethylene-prop-1'-en-1'-yl)-estr-4-en-3-ols are converted to the corresponding 3β-oxy derivatives, e.g. 3β-(tetrahydropyran-2'-yloxy)-17α-(2',3'-difluoromethylene-prop-1'-en-1'-yl)-estr-4-en-3-ol, 3β-(tetrahydrofuran-2'-yloxy)-17α-(2',3'-difluoromethylene-prop-1'-en-1'-yl)-estr-4-en-3-ol, 3β-(4'-methoxytetrahydropyran-4'-yloxy)-17α-(2',3'-difluoromethylene-prop-1'-en-1'-yl)-estr-4-en-17β-ol, 3β-(tetrahydropyran-2'-yloxy)-17α-(2',3'-difluoromethylene-prop-1'-en-1'-yl)-androst-4-en-17 β-ol, 3β-(tetrahydrofuran-2'-yloxy)-17α-(2',3'-difluoromethylene-prop-1'-en-1'-yl)-androst-4-en-17 β-ol, and the like.

EXAMPLE 14

A solution of 1 g. of 3-methoxy-17α-(1'-methyl-propadien-1'-yl)-estra-1,3,5(10)-trien-17β-ol in 100 ml. of benzene containing 1.2 equivalents of phenyl (trichloromethyl) mercury is heated to reflux for 18 hours. The cooled mixture is filtered, washed with water, dried and then evaporated to dryness. The 3-methoxy-17α-(1'-methyl-2',3'-dichloromethylene-prop-1'-en-1'-yl)-estra-1,3,5(10)-trien-17β-ol is then recrystallized from acetone-ether.

Similarly, 3-acetoxy-17α-(propadien-1'-yl)-estra-1,3,5(10)-trien-17β-ol, 3-acetoxy-17α-(propadien-1'-yl)-17β-propionoxyestra-1,3,5(10)-triene, 3-acetoxy-17α-(propadien-1'-yl)-18-ethylestra-1,3,5(10)-trien-17β-ol, and 3-acetoxy-17α-(propadien-1'-yl)-18-methylestra-1,3,5(10)-trien-17β-ol is reacted with phenyl (trichloromethyl) mercury to yield the corresponding 17α-(2',3'-dichloromethylene-prop-1'en-1'-yl) derivatives.

EXAMPLE 15

To a refluxing solution of 1 g. of 17β-acetoxy-17α-(propadien-1'-yl)-estra-1,3,5(10)-trien-3-ol in 50 ml. of dimethoxyethane is added 4 molar equivalents of phenyl (fluorodichloromethyl) mercury, 4 molar equivalents of sodium iodide. After refluxing for 18 hours, the mixture is filtered, washed with water and evaporated to dryness, and the residue chromatographed on alumina, eluting with benzene and benzene methylene chloride to yield 17β-acetoxy-17α-(2',3'-fluorochloromethylene-prop-1'-en-1'-yl)-estra-1,3,5 (10)-trien-3-ol.

In a similar manner
3-methoxy-17α-(propadien-1'-yl)-17β-acetoxy-18-methylestra-1,3,5(10)-triene,
3-methoxy-17α-(1'-methyl-propadien-1'-yl)-17β-acetoxy-estra-1,3,5(10)-triene, 1,3,5(10)-triene,
3-methoxy-17α-(1',3'-dimethyl-propadien-1'-yl)-17β-acetoxy-18-ethylestra-1,3,5(10)triene,
3,17β-diacetoxy-17α-(propadien-1'-yl)-estra-1,3,5(10)-triene,
17α-(1'-methyl-propadien-1'-yl)-17β-acetoxy-estr-4-en-3-one,
17α-(propadien-1'-yl)-17β-acetoxy-androst-4-en-3-one,
17α-(propadien-1'-yl)-17β-hydroxy-18-methyl-androst-4-en-3-one, and
17α-(propadien-1'-yl)-17β-hydroxy-18-methylestr-4-en-3-one are subject to the foregoing procedure to yield
3-methoxy-17α-(2',3'-fluorochloromethylene-prop-1'-en-1'-yl)-18-methylestra-1,3,5(10)-triene,
3-methoxy-17α-(1'-methyl-2',3'-fluorochloromethylene-prop-1'-en-1'-yl)-17β-acetoxyestra-1,3,5(10)-triene,
3-methoxy-17α-(3',3'-dimethyl-2',3'-fluorochloromethylene-prop-1'-en-1'-yl)-17β-acetoxy-18-ethylestra-1,3,5(10)-triene,
3,17β-diacetoxy-17α-(2',3'-fluorochloro-prop-1'-en-1'-yl)-estra-1,3,5(10)-triene,
17α-(1'-methyl-2',3'-fluorochloro-prop-1'-en-1'-yl)-17β-acetoxy-estr-4-en-3-one,
17α-(2',3'-fluorochloromethylene-prop-1'-en-1'-yl)-17β-acetoxy-androst-4-en-3-one,
17α-(2',3'-fluorochloromethylene-prop-1'-en-1'-yl)-17β-hydroxy-18-methyl-androst-4-en-3-one, and
17α-(2',3'-fluorochloromethylene-prop-1'-en-1'-yl)-17β-hydroxy-18-methyl-estr-4-en-3-one.

Substituting phenyl (chlorodibromomethyl) mercury in the above procedure, the corresponding chlorobromo derivatives are obtained, e.g.
17β-acetoxy-17α-(2',3'-chlorobromomethylene-prop-1'-en-1'-yl)-estra-1,3,5(10)-triene-3-ol,
3-methoxy-17α-(2',3'-chlorobromomethylene-prop-1'-en-1'-yl)-18-methyl-estra-1,3,5(10)-triene,
3-methoxy-17α-(1'-methyl-2',3'-chlorobromomethylene-prop-1'-en-1'-yl)-17β-acetoxy-estra-1,3,5(10)-triene,
3-methoxy-17β-(1',3'-dimethyl-2',3'-chlorobromomethylene-prop-1'-en-1'-yl)-17β-acetoxy-18-ethyl-estra-1,3,5(10)-triene, etc.

By using the phenyl (trichloromethyl) mercury in the foregoing procedure, the corresponding dichloro derivatives are obtained, e.g.
17β-acetoxy-17α-(2',3'-dichloromethylene-prop-1'-en-1'-yl)-estra-1,3,5(10)-trien-3-ol.

EXAMPLE 16

A solution of 1 g. of 17β-acetoxy-17α-(2',3'-fluorochloromethylene-prop-1'-en-1'yl)-estra-1,3,5 (10)-trien-3-ol (prepared by the method of Example 15) in 60 ml. of anhydrous ether is treated with 7.5 molar equivalents of ethylmagnesium bromide in ether and after a few minutes, with 7.5 molar equivalents of chloroacetate. The mixture is allowed to stand at room temperature for 15 hours, then diluted with water, and extracted with methylene chloride. The extracts are washed with water to neutrality, dried and evaporated. The residue is chromatographed on neutral alumina, eluting with ether:hexane to yield 3,17β-diacetoxy-17 α-(2',3'-fluorochloromethylene-prop-1'-en-1'-yl)-estra-1,3,5(10)-triene which is recrystallized from acetone:hexane.

The above procedure is repeated substituting chloropropionate for chloroacetate and the corresponding 3-propionoxy-17β-acetoxy-estratriene derivative is obtained.

EXAMPLE 17

Two milliliters of dihydropyran are added to a solution of 1 g. of 17β-acetoxy-17α-(2',3'-fluorochloromethylene-prop-1'-en-1'-yl)-estra-1,3,5 (10)-trien-3-ol, (prepared by the procedure of Example 15) in 15 ml. of benzene. About 1 ml. is removed by distillation to remove moisture and 0.4 g. of p-toluenesulfonic acid is added to the cooled solution. This mixture is allowed to stand at room temperature for 4 days, and then washed with aqueous sodium carbonate solution and water, dried and evaporated. The residue is chromatographed on neutral alumina, eluting with hexane to yield 3-tetrahydropyran-2'-yloxy-17β-acetoxy-17α-(2',3'-fluorochloromethylene-prop-1'-en-1'-yl)-estra-1,3,5(10)-triene.

Substituting dihydrofuran for dihydropyran in the above reaction, the corresponding 3-(tetrahydrofuran-2'-yloxy) derivative is obtained.

EXAMPLE 18

A solution of one equivalent of 17β-acetoxy-17α-(2',3'-fluorochloromethylene-prop-1'-en-1'-yl)-estra-1,3,5(10)-trien-3-ol (prepared by the procedure of Example 15) in 30 ml. of benzene is heated to reflux and about 2 ml. removed by distillation to eliminate moisture. The mixture is cooled to room temperature and 1 g. equivalent of sodium hydride is added, followed by the dropwise addition of 1.5 chemical equivalents of cyclopentylbromide in 10 ml. of benzene over a period of 20 minutes. The mixture is allowed to reflux for 20 hours after which time the precipitate of sodium bromide is removed by filtration and the organic phase dried and evaporated to yield 3-cyclopentyloxy-17β-acetoxy-17α-(2′,3′-fluorochloromethylene-prop-1′-en-1′-yl)-estra-1,3,5(10)-triene which is further purified upon recrystallization from pentane.

EXAMPLE 19

A solution of 1 g. of 3-(tetrahydropyran-2′-yloxy)-17β-acetoxy-17α-(2′,3′-fluorochloromethylene-prop-1′-en-1′-yl)-estra-1,3,5(10)-triene, (prepared following the procedure of Example 17) in 50 ml. of methanol is heated at reflux for 3 hours with a solution of 0.2 grams of potassium hydroxide in 1 ml. of water. The reaction mixture is then poured into ice water and the solid which forms is collected by filtration, washed with water to neutrality and dried to yield 3-(tetrahydropyran-2′-yloxy)-17α-(2′,3′-fluorochloromethylene-prop-1′-en-1′-yl)-estra-1,3,5(10)-trien-17β-ol.

Substituting a 3-(tetrahydrofuran-2′-yloxy)-17β-acetoxy-estratriene in the above reaction, the corresponding 3-(tetrahydrofuran-2-yloxy)-17β-ol is obtained.

The 3-(tetrahydropyran-2′-yloxy)-17α-(2′,3′-fluorochloromethylene-prop-1′-en-1′-yl)-estra-1,3,5(10)-trien-17β-ol obtained above is alternatively hydrolyzed with concentrated HCl in aqueous acetone to the corresponding 3,17β-diol. The thus obtained diol is reacted with acetic anhydride in pyridine to yield the 3-acetoxy-17β-hydroxy derivative.

The 3-acetoxy-estra-1,3,5-trien-17β-ol derivative is then reacted with dihydropyran in benzene according to the procedure of Example 16 to yield 3-acetoxy-17β-(tetrahydropyran-2′-yloxy)-17α-(2′,3′-fluorochloromethylene-prop-1′-en-1′-yl)-estra-1,3,5(10)-triene.

EXAMPLE 20

A mixture of 2 grams of 17β-acetoxy-17α-(2′,3′-fluorochloromethylene-prop-1′-en-1′-yl)-estra-1,3,5(10)-trien--trien-3-ol in 8 ml. of pyridine and 4 ml. of benzoyl chloride is heated at steam bath temperatures for 1 hour. The mixture is then poured into ice water and the solid which forms is collected by filtration, washed with water and dried to yield 3-benzoyloxy-17β-acetoxy-17α-(2′,3′-fluorochloromethylene-prop-1′-en-1′1,3,5(10)-triene which is further purified through recrystallization from acetone-hexane:hexane.

The use of this process with the other 3-hydroxy compounds of the present invention will similarly yield the corresponding 3-benzoyloxy derivatives.

Obviously many modifications and variations of the invention described hereinabove and in the appended claims can be made without departing from the essence and scope thereof.

What I claim is:

1. A compound selected from compounds of the formulas:

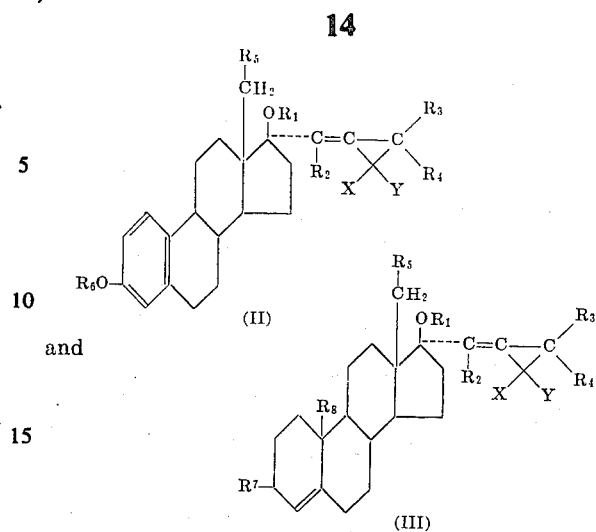

wherein $R_1$ is H, carboxylic acyl group of less than 12 carbon atoms, tetrahydropyran-2-yl, tetrahydrofuran-2-yl or 4-methoxy tetrahydropyran-4-yl; $R_2$, $R_3$ and $R_4$ are independently H or a lower alkyl; $R_5$ is H or lower alkyl; $R_6$ is H, lower alkyl, carboxylic acyl having less than 12 carbon atoms, cyclopentyl tetrahydropyran-2-yl or tetrahydrofuran-2-yl; $R_7$ is oxo, or the group

wherein $R_9$ is hydrogen, hydroxy, tetrahydropyran-2′-yloxy, tetrahydrofuran-2′-yloxy or a carboxylic acyloxy group containing less than 12 carbon atoms, $R_8$ is H or methyl and X and Y are independently selected from the group consisting of H, F, Br and Cl.

2. The compound of claim 1, Formula III, wherein $R_1$, $R_2$, $R_3$, $R_4$, and $R_5$ are hydrogen, and $R_8$ is methyl.

3. The compound of claim 1, Formula III, wherein $R_1$ is acetoxy, $R_2$ is methyl, $R_3$, $R_4$, and $R_5$ are hydrogen and $R_8$ is methyl.

4. The compound of claim 1 wherein $R_2$, $R_3$, and $R_4$ are selected from the group consisting of H, or methyl.

5. The compound of claim 4 wherein $R_2$, $R_3$, and $R_4$ are H.

6. The compound of claim 1, Formula III, wherein $R_8$ is H.

7. The compound of claim 1 wherein $R_5$ is H.

8. The compound of claim 1 wherein $R_2$, $R_3$, $R_4$ and $R_5$ are H.

9. The compound of claim 1, Formula III, wherein $R_2$, $R_3$, $R_4$, $R_5$ and $R_8$ are H.

10. The compound of Formula II of claim 1, wherein $OR_1$ is hydroxy, $R_5$ is H, $R_6O$ is hydroxy or methoxy and X and Y are independently selected from the group consisting of H and F.

11. The compound of Formula III of claim 1, wherein $OR_1$ is hydroxy or acetate, $R_5$ is H or methyl, $R_7$ is oxo or the group

wherein $R_9$ is H or hydroxy and X and Y are independently selected from the group consisting of H and F.

* * * * *